United States Patent
Okumura et al.

(10) Patent No.: US 12,251,943 B2
(45) Date of Patent: Mar. 18, 2025

(54) RECORDING METHOD AND INK DISCHARGE DEVICE

(71) Applicant: BROTHER KOGYO KABUSHIKI KAISHA, Nagoya (JP)

(72) Inventors: Yuki Okumura, Iwakura (JP); Hiroyuki Tanaka, Inazawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 213 days.

(21) Appl. No.: 18/055,883

(22) Filed: Nov. 16, 2022

(65) Prior Publication Data
US 2023/0083771 A1 Mar. 16, 2023

Related U.S. Application Data

(63) Continuation of application No. PCT/JP2021/018377, filed on May 14, 2021.

(30) Foreign Application Priority Data

May 18, 2020 (JP) .................. 2020-086694

(51) Int. Cl.
*B41J 2/21* (2006.01)
*B41J 11/00* (2006.01)
(Continued)

(52) U.S. Cl.
CPC ............. *B41J 2/2107* (2013.01); *C09D 11/10* (2013.01); *C09D 11/322* (2013.01); *B41J 11/00212* (2021.01); *B41J 11/00216* (2021.01)

(58) Field of Classification Search
CPC ............ B41J 2/2107; B41J 11/00212; B41J 11/00216; C09D 11/10; C09D 11/322; C09D 11/326
See application file for complete search history.

(56) References Cited

U.S. PATENT DOCUMENTS 8,045,201 B2 * 10/2011 Yamazaki .......... H04N 1/32614
358/1.14
8,382,274 B2 * 2/2013 Mitsuzawa ........ B41J 11/00212
347/102
(Continued)

FOREIGN PATENT DOCUMENTS

JP 2001212948 A 8/2001
JP 2007261090 A 10/2007
(Continued)

OTHER PUBLICATIONS

International Preliminary Report on Patentability and Written Opinion issued Nov. 17, 2022 in PCT/JP2021/018377 (with English translation), 8 pages.
(Continued)

*Primary Examiner* — Geoffrey S Mruk
(74) *Attorney, Agent, or Firm* — Element IP, PLC (57) ABSTRACT

A recording method includes: recording a first image on a recording medium; reading the first image to determine whether the first image is correctly recorded; and when the first image is determined as not being correctly recorded, recording a second image over the first image. The water-based recording ink includes a water-soluble organic solvent which is at least one selected from the group consisting of a glycol ether and a diol compound having six to eight carbon atoms and two hydroxyl groups, at least one of the two hydroxyl groups not being bonded to a terminal of a carbon chain of the diol compound. A content of substances having a vapor pressure of 0.03 hPa or less at 20° C. in the water-based recording ink is 10 mass % or less and a surface tension of the water-based recording ink is 30 mN/m or less.

20 Claims, 5 Drawing Sheets

(51) Int. Cl.
    *C09D 11/10*     (2014.01)
    *C09D 11/322*     (2014.01)

(56) References Cited

U.S. PATENT DOCUMENTS

| | | |
|---|---|---|
| 9,657,187 B2 * | 5/2017 | Kagata .................. C09D 11/10 |
| 9,821,570 B2 | 11/2017 | Naramatsu et al. |
| 2007/0223023 A1 | 9/2007 | Yamazaki |
| 2007/0234399 A1 | 10/2007 | Yamazaki |
| 2016/0244626 A1 | 8/2016 | Kagata et al. |
| 2018/0239289 A1 | 8/2018 | Takada |

FOREIGN PATENT DOCUMENTS

| | | | |
|---|---|---|---|
| JP | 2007264829 A | 10/2007 | |
| JP | 2012213906 A | 11/2012 | |
| JP | 2013087207 A | 5/2013 | |
| JP | 2018134762 A | 8/2018 | |
| JP | 2019081908 A | 5/2019 | |

OTHER PUBLICATIONS

International Search Report issued Aug. 3, 2021 in PCT/JP2021/018377 (with English translation), 5 pages.

Office Action issued Apr. 16, 2024 in corresponding Japanese Patent Application No. 2020-086694 (with machine English translation), 5 pages.

Extended European Search Report issued May 15, 2024 in corresponding European Patent Application No. 21809849.9, 9 pages.

\* cited by examiner

RECORDING METHOD AND INK DISCHARGE DEVICE

CROSS-REFERENCE TO RELATED APPLICATIONS

The present application is a continuation application of International Application No. PCT/JP2021/018377, filed May 14, 2021, which claims priority to Japanese Patent Application No. 2020-086694 filed May 18, 2020. The contents of these applications are incorporated herein by reference in their entirety.

BACKGROUND OF THE DISCLOSURE

Technical Field

The present disclosure relates to a recording method and an ink discharge device for further recording a second image on a recording medium on which a first image has been recorded.

Background Art

A printing device that fixates ink discharged from a nozzle of a print head and adhered to a recording medium by heating the recording medium with a heater is known.

Furthermore, a printing result invalidation process for performing so-called void printing on already printed portions when an image printed on the recording medium is determined and the printing result is not a pass is known.

SUMMARY OF THE DISCLOSURE

According to an aspect of the present disclosure, a recording method includes: discharging a water-based recording ink from a head onto a recording medium conveyed in a conveying direction and heating the recording medium or the water-based recording ink adhered to the recording medium with a heater to record a first image on the recording medium; reading the first image to determine whether the first image is correctly recorded; and when the first image is determined as not being correctly recorded, conveying the recording medium in a reverse direction relative to the conveying direction, and recording a second image over the first image. The water-based recording ink includes: a resin-dispersed pigment; a fine resin particle; a water-soluble organic solvent; and water. The water-soluble organic solvent includes at least one selected from the group consisting of a glycol ether and a diol compound having six to eight carbon atoms and two hydroxyl groups, at least one of the two hydroxyl groups not being bonded to a terminal of a carbon chain of the diol compound. A content of substances having a vapor pressure of 0.03 hPa or less at 20° C. in the water-based recording ink relative to a total mass of the water-based recording ink is 10 mass % or less, and a surface tension of the water-based recording ink is 30 mN/m or less.

According to another aspect of the present disclosure, an ink discharge device includes: comprising: a conveying unit for conveying a recording medium in a conveying direction; a head for discharging a water-based recording ink, a heater for heating the recording medium or the water-based recording ink adhered to the recording medium; a reading unit for reading a first image recorded on the recording medium; and a controller which determines whether the first image read by the reading unit is correctly recorded or not. The water-based recording ink includes: a resin-dispersed pigment; a fine resin particle; a water-soluble organic solvent; and water. The water-soluble organic solvent includes at least one selected from the group consisting of a glycol ether and a diol compound having six to eight carbon atoms and two hydroxyl groups, at least one of the two hydroxyl groups not being bonded to a terminal of a carbon chain of the diol compound. A content of substances having a vapor pressure of 0.03 hPa or less at 20° C. in the water-based recording ink relative to a total mass of the water-based recording ink is 10 mass % or less, and a surface tension of the water-based recording ink is 30 mN/m or less. When the first image is determined as not being correctly recorded, the conveying unit conveys the recording medium in a reverse direction relative to the conveying direction, and the water-based recording ink is discharged from the head to the recording medium to record a second image over the first image.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

As used herein, the words "a" and "an" and the like carry the meaning of "one or more." When an amount, concentration, or other value or parameter is given as a range, and/or its description includes a list of upper and lower values, this is to be understood as specifically disclosing all integers and fractions within the given range, and all ranges formed from any pair of any upper and lower values, regardless of whether subranges are separately disclosed. Where a range of numerical values is recited herein, unless otherwise stated, the range is intended to include the endpoints thereof, as well as all integers and fractions within the range. As an example, a stated range of 1-10 fully describes and includes the independent subrange 3.4-7.2 as does the following list of values: 1, 4, 6, 10.

In void printing using ink that requires drying with a heater, the ink is newly adhered and dried on top of ink already adhered and dried on a sheet. Solvents contained in ink are removed from the ink by absorption into the sheet and evaporation, but in void printing, the ink in an already printed image prevents the ink in void printing from being absorbed into the sheet, and thus the ink does not dry readily. As a result, there is a problem in that abrasion resistance of the void printing decreases.

Furthermore, in order to perform void printing on a continuous sheet, it is necessary to convey the already printed portion in a reverse direction relative to a position opposing the head. In such reverse direction conveyance of a sheet, ink discharged from the head adheres, but portions not sufficiently heated by a heater, that is, portions of the sheet where ink is not sufficiently dried, are also conveyed in the reverse direction. As a result, there is a risk that ink that is not sufficiently dried will adhere to a conveyance mechanism, such as on a roller.

An embodiment of the present disclosure relates to a recording method for discharging a water-based recording ink from a head onto a recording medium conveyed in a conveying direction by a conveyance mechanism and heating the recording medium or the water-based recording ink adhered to the recording medium via a heater. The present recording method reads a first image recorded on a recording medium via a reading unit, determines whether the read first image is correct, and on the condition that the determination result of the first image is that it is incorrect, conveys the recording medium in a reverse direction relative to the conveying direction via a conveyance mechanism and discharges the water-based recording ink from the head onto the recording medium to record a second image on top of the first image. The water-based recording ink includes a resin-dispersed pigment, fine resin particles, a water-soluble organic solvent, and water. The water-soluble organic solvent is one or more types selected from a diol compound having six to eight carbon atoms and two hydroxyl groups, at least one hydroxyl group not being bonded to a terminal of the carbon chain, and a glycol ether. The water-based recording ink has 10 mass % or less of substances having a vapor pressure of 0.03 hPa or less at 20° C. with respect to the total mass of ink and has a surface tension of 30 mN/m or less.

Furthermore, another embodiment of the present disclosure also relates to an ink discharge device provided with a conveyance mechanism for conveying a recording medium in a conveying direction, a head for discharging a water-based recording ink, a heater for heating the recording medium or the water-based recording ink adhered to the recording medium, a reading unit for reading a first image recorded on the recording medium, and a controller. The water-based recording ink includes a resin-dispersed pigment, fine resin particles, a water-soluble organic solvent, and water. The water-soluble organic solvent is one or more types selected from a diol compound having six to eight carbon atoms and two hydroxyl groups, at least one hydroxyl group not being bonded to a terminal of the carbon chain, and a glycol ether. The water-based recording ink has 10 mass % or less of substances having a vapor pressure of 0.03 hPa or less at 20° C. with respect to the total mass of ink and has a surface tension of 30 mN/m or less. The controller determines whether the first image read by the reading unit is correct, and on the condition that the determination result of the first image is that it is incorrect, the conveyance mechanism conveys the recording medium in a reverse direction relative to the conveying direction, and the water-based recording ink is discharged from the head onto the recording medium to record a second image on top of the first image.

By the method and the device, means having quick ink drying suitable for recording plural images overlapping with each other and having excellent recording medium abrasion resistance after recording, is provided.

The printing device 10 according to an embodiment of the present disclosure will be described below. Note that the embodiment described below is merely one example of the present disclosure, and it goes without saying that the embodiment can be appropriately changed within a scope that does not change the essence of the present disclosure. Furthermore, in the description below, movement from the start point to the end point of the arrow is expressed as an orientation, and traffic on the line connecting the start point and the end point of the arrow is expressed as a direction.

Moreover, in the description below, a vertical direction 7 is defined with reference to a state in which the printing device 10 is installed so as to be usable (state of FIG. 1), a front and back direction 8 is defined such that a side where a dispensing port 13 is provided as the front side (front surface), and a left and right direction 9 is defined from a point of view of the printing device 10 from the front side (front surface).

[External Configuration of the Printing Device 10]

Figure 1:
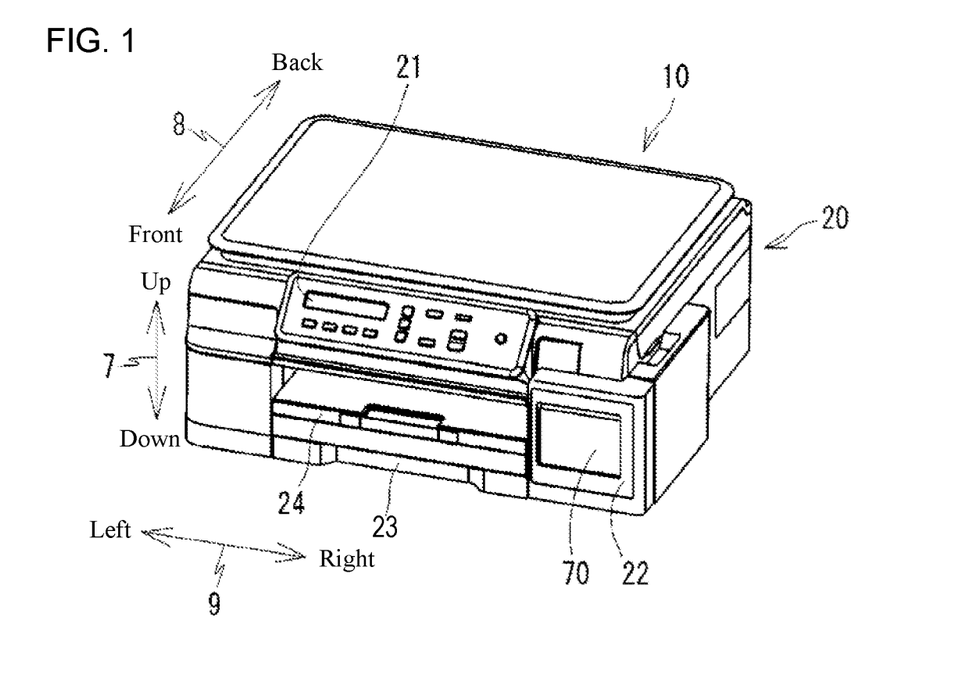
FIG. 1 is a perspective view of a printing device 10.

As illustrated in FIG. 1, the printing device 10 is provided with a housing 20, and a panel unit 21, a cover 22, a paper feed tray 23, and a paper dispensing tray 24, held by the housing 20. The printing device 10 records an image on a sheet 6 (see FIG. 2).

The sheet 6 is an embodiment of a recording medium. The sheet 6 may be a recording medium that is cut to a predetermined dimension, it may be drawn from a roll wound in a cylindrical shape, or it may be of a fan-fold type. The sheet 6 may be plain paper or coated paper. "Coated paper" means, for example, plain paper composed of pulp of high-quality printing paper or medium-quality printing paper and coated with a coating agent in order to improve smoothness, whiteness, glossiness, and the like, and specific examples includes high-quality coated paper, medium-quality coated paper, and the like. The printing device 10 can be suitably used for inkjet recording on coated paper, but is not limited to this and can also be used for inkjet recording on recording media other than coated paper such as plain paper, glossy paper, matte paper, synthetic paper, paperboard, corrugated cardboard, film, and the like. Furthermore, the sheet 6 may be sticker paper that combines an adhesive and release paper.

The panel unit 21 is provided with a touch panel and a plurality of operation switches. The panel unit 21 accepts user operations.

Figure 2:
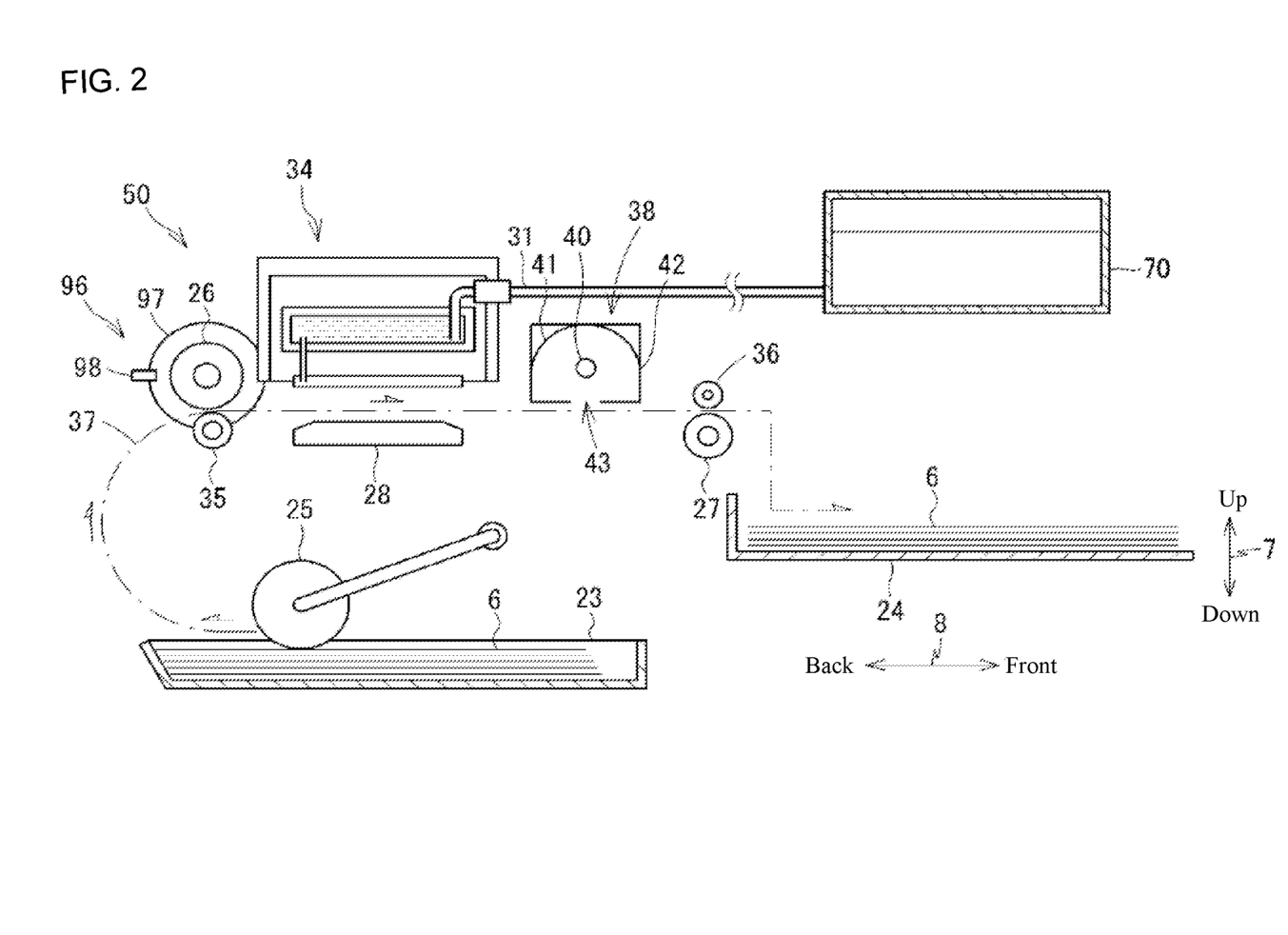
FIG. 2 is a schematic diagram illustrating an internal configuration of the printing device 10.

As illustrated in FIG. 2, a paper feed tray 23 is positioned on a lower portion of the housing 20. The paper dispensing tray 24 is a lower part of the housing 20 and is positioned on the paper feed tray 23. A cover 22 is positioned on a right part of the front surface of the housing 20. The cover 22 can be rotated with respect to the housing 20. When the cover 22 is opened, a tank 70 for storing ink can be accessed.

Note that while only one tank 70 is illustrated in the present embodiment, the tank 70 is not limited to storing ink of one color such as black, and it may have four storage chambers that, for example, respectively store ink of the four colors of black, yellow, cyan, and magenta.

As illustrated in FIG. 2, the housing 20 holds a print engine 50 therein. The printing engine 50 is mainly provided with a feed roller 25, a conveyance roller 26, a dispensing roller 27, a platen 28, and a recording unit. The feed roller 25 is held by a frame not illustrated provided in the housing 20 so as to be able to abut the sheet 6 placed on the paper feed tray 23. The feed roller 25 is rotated by a motor not illustrated. The rotating feed roller 25 sends the sheet 6 to a conveyance path 37. The conveyance path 37 is a space partitioned by a guide member not illustrated. In the illustrated example, the conveying path 37 extends curving from a rear end of the paper feed tray 23 to a position above the paper feed tray 23 and then extends forward. The feed roller 25, the conveyance roller 26, and the dispensing roller 27 are examples of the conveyance mechanism.

The conveyance roller 26 is positioned downstream of the paper feed tray 23 in the conveying direction of the sheet 6. The conveyance roller 26 forms a roller pair together with a driven roller 35. The conveyance roller 26 is rotated by a motor not illustrated. The rotating conveyance roller 26 and the driven roller 35 simultaneously sandwich and convey the sheet 6 sent to the conveyance path 37 by the feed roller 25. The dispensing roller 27 is positioned downstream of the conveyance roller 26 in the conveying direction of the sheet 6. The dispensing roller 27 forms a roller pair together with a driven roller 36. The dispensing roller 27 is rotated by a motor not illustrated. The rotating dispensing roller 27 and the driven roller 36 simultaneously sandwich and convey the sheet 6 and dispense it in the paper dispensing tray 24. The platen 28 is positioned between the conveyance roller 26 and the dispensing roller 27 in the front and back direction 8, downstream of the conveyance roller 26, and upstream of the dispensing roller 27 in the conveyance direction of the sheet 6.

The conveyance roller 26 is provided with a rotary encoder 96. The rotary encoder 96 has an encoder disk 97 and an optical sensor 98. The encoder disk 97 is provided coaxially with the conveyance roller 26 and rotates together with the conveyance roller 26. A plurality of two kinds of indices having different transmissivity are alternatingly arranged on the whole circumference of the encoder disk 97 in the circumferential direction. The optical sensor 98 can optically read the two kinds of indices of the encoder disk 97. Two kinds of signals are outputted in the form of a pulse from the optical sensor 98 due to the optical sensor reading the two kinds of indices of the rotating encoder disk 97. The output signals of the optical sensor 98 are received by a controller that will be described later, and the rotational speed of the conveyance roller 26 is determined.

The recording unit has a print head 34 and a heater 38. The print head 34 is positioned between the conveyance roller 26 and the dispensing roller 27. The print head 34 may be a so-called serial head or a so-called line head. The print head 34 has therein a channel in which ink flows. The channel is made continuous with the tank 70 by a tube 31. That is, ink stored in the tank 70 is supplied to the print head 34 through the tube 31.

The platen 28 is positioned below the print head 34. An upper surface of the platen 28 is a supporting surface of the sheet 6. Although not shown in each drawing, an opening that generates suction pressure is formed on the upper surface of the platen 28. The sheet 6 is brought into close contact with the upper surface of the platen 28 via suction pressure generated on the upper surface of the platen 28.

Figure 3:
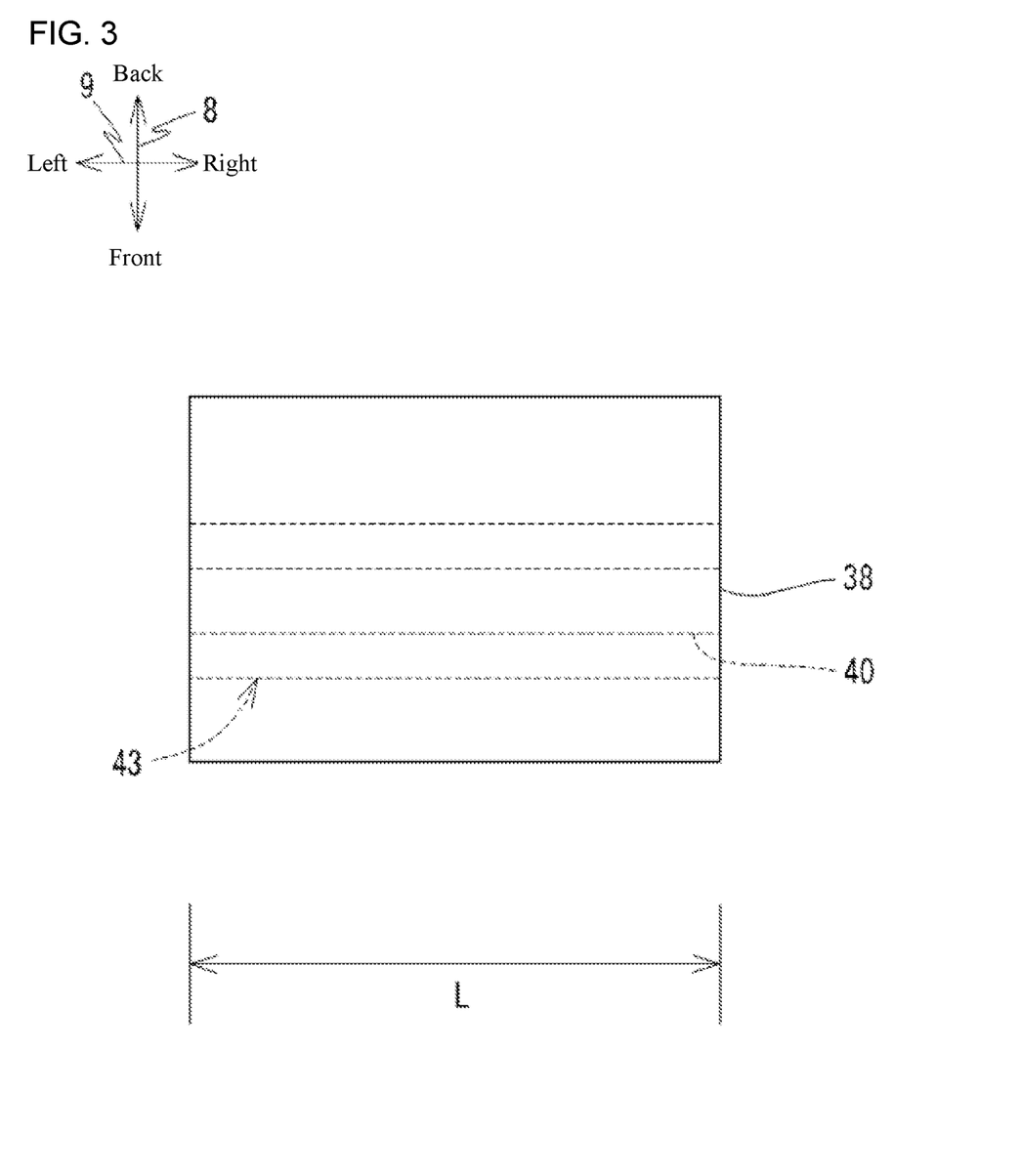
FIG. 3 is a schematic diagram of a heater 38 viewed from above.

As illustrated in FIG. 2 and FIG. 3, the heater 38 is positioned above the conveyance path 37 downstream of the print head 34 and upstream of the dispensing roller 27. The heater 38 is a so-called halogen heater. A distance D in the front and back direction 8 between the print head 34 and the heater 38 is preferably 30 cm or less, more preferably 20 cm or less, and particularly preferably 10 cm or less.

As illustrated in FIG. 2, the heater 38 is positioned downstream, that is, in front of, the print head 34 in the conveyance direction. The heater 38 has a halogen lamp 40, which is a heating element that radiates infrared rays, a reflecting plate 41, and a housing 42. The housing 42 has a shape substantially like a rectangular prism and opens downward. An opening 43 is positioned on a lower wall of the housing 42. Heat from the halogen lamp 40 and the reflecting plate 41 is radiated externally through the opening 43 or is blocked.

The halogen lamp 40 is positioned in an internal space of the housing 42. The halogen lamp 40 has an elongated cylindrical shape, and the left and right direction 9 is a longitudinal direction. In the internal space of the housing 42, the reflecting plate 41 is positioned above the halogen lamp 40. The reflecting plate 41 is a metal plate coated with a ceramic film or the like and is curved in an arc shape having a center axis near the opening 43. Note that a halogen lamp 40 coated with a ceramic film or the like may be used instead of the reflective plate 41.

The heater 38 heats at least one of the sheet 6 passing below the opening 43 and the ink adhered to the sheet 6. In this embodiment, the heater 38 heats both the sheet 6 and the ink. Fine resin particles are glass-transitioned by heating the ink, the sheet 6 passing below the heater 38 is cooled, and the glass-transitioned resin is hardened. Thus, the ink is fixated to the sheet 6.

The power consumption of the heater 38 is preferably 600 W or less, more preferably 400 W or less, and particularly preferably 200 W or less, due to the required size reduction. Power consumption of the heater 38 is related to energy irradiated per unit area of the sheet from the heater 38. The irradiation energy is a heating amount (J) applied to a unit area ($cm^2$) of a sheet when the heater 38 is driven according to power consumption and the sheet moving below the heater 38 is moved at a constant conveying speed.

As illustrated in FIG. 3, an irradiated length L in the left and right direction 9 (an example of the width direction) of the heater 38, that is, a length L in the left and right direction 9 within the range in which the halogen lamp 40 and the opening 43 overlap, is preferably 25 cm or less, more preferably 21 cm or less, and particularly preferably 15 cm or less, due to the required size reduction.

The heater 38 is not limited to a halogen heater insofar as the sheet or ink can be heated. For example, the heater 38 may be a carbon heater, a dryer, an oven, a belt conveyor oven, or the like.

A CIS (contact image sensor) 29 (an embodiment of the reading unit) is located downstream of the heater 38 in the conveying direction and upstream of the dispensing roller 27 in the conveying direction. The CIS 29 outputs an electric signal according to the intensity of reflected light received by the line sensor, the reflected light being irradiated from a light source such as an LED, reflected by the sheet 6, and condensed in the line sensor by a refractive index distribution lens. The CIS 29 can read an image of a printing surface (upper surface) of the sheet 6. In the CIS 29, the left and right direction 9 is the reading line. Note that in the present embodiment, the CIS 29 is located inside the housing 20, but the CIS 29 may be located outside the housing 20.

Figure 4:
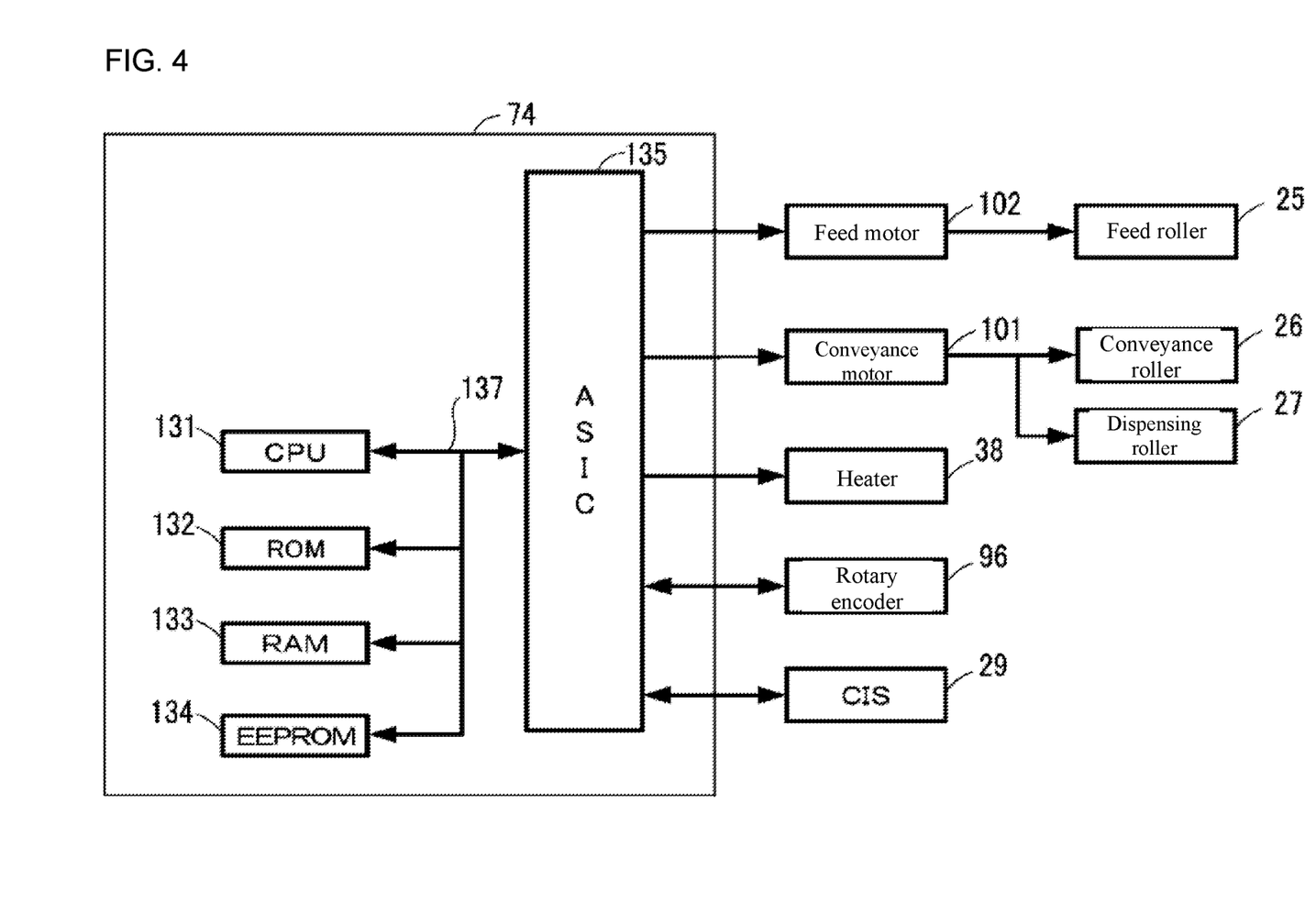
FIG. 4 is a block diagram illustrating a controller 74.

As illustrated in FIG. 4, a controller 74 and a power circuit (not illustrated) are disposed in an internal space of a housing 14. The controller 74 is connected to a CPU 131, a ROM 132, a RAM 133, an EEPROM 134, an ASIC 135, a CIS 29, and the like to allow data communication via a bus 137. Operation of the printing device 10 is controlled by the CPU 131 executing a program stored in the ROM 132 and the ASIC 135 performing a specific set function.

Note that the controller 74 may execute various processes via the CPU 131 alone or may execute various processes via the ASIC 135 alone. Furthermore, a plurality of the CPU 131 is installed in the controller 74, and the controller 74 may be such that the plurality of CPU 131 apportions each process. Moreover, a plurality of the ASIC 135 is installed in the controller 74, and the controller 74 may be such that the plurality of ASIC 135 apportions each process.

The power supply circuit is a circuit configured from a large capacity capacitor and the like. In the present embodiment, the power supply circuit is installed on a substrate configured from phenolic paper or the like. The power supply circuit is a circuit for performing conversion of power for supplying power to each component provided to the printing device 10.

For example, power is supplied from a power supply circuit to a feeding motor 102 and a conveying motor 101, and rotation of each motor is transmitted to the feed roller 25, the conveyance roller 26, and the dispensing roller 27. Furthermore, power is supplied from the power supply circuit to the heater 38 and the CIS 29.

The controller 74 controls the rotational speed of a first conveyance roller 60 and a second conveyance roller 62 so that the cumulative heating amount received from the heater 38 at the position opposing the heater 38 per unit area of the sheet 6 is preferably within a range of 0.05 J/cm$^2$ to 2.50 J/cm$^2$, more preferably within a range of 0.05 J/cm$^2$ to 1.50 J/cm$^2$ or less, and particularly preferably within a range of 0.06 J/cm$^2$ to 0.25 J/cm$^2$ or less. That is, the conveying speed of the sheet 6 below the heater 38 is controlled. The conveying speed of the sheet 6 below the heater 38 is preferably within a range of 20 cm/s to 100 cm/s, more preferably within a range of 20 cm/s to 80 cm/s, and particularly preferably 20 cm/s to 70 cm/s.

The cumulative heating amount per unit area of the sheet 6 can be measured, for example, as follows. A power density (W/m2), which is the power per unit area of the heater 38, is calculated from the power applied to the heater 38 and the area (for example, the projected area of the opening 43) of the region where the heater 38 radiates infrared rays (the region in a plane in the front and back direction 8 and the left and right direction 9). For example, when the power consumption of the heater 38 is 600 W and the region where the heater 38 radiates infrared rays is 50 cm$^2$, the power density is 12 W/cm$^2$. Furthermore, time (seconds) required for a fixed point on the sheet 6 to pass through a region where the heater 38 radiates infrared rays is calculated from the conveying speed of the sheet 6. Then, the cumulative heating amount (J/cm$^2$) is calculated by multiplying this time by the power density. Note that the cumulative heating amount per unit area of the sheet 6 is the value when the sheet 6 passes through the position opposing the heater 38 once while the heater 38 is energized. When void printing is carried out, the sheet 6 passes through the position opposing the heater 38 twice while the heater 38 is energized, but the cumulative heating amount per unit area of the sheet 6 is not the total value when the sheet 6 passes through the position opposing the heater 38 twice.

[Ink Composition]

Details of the ink (an embodiment of the water-based recording ink) stored in the tank 70 are described below. The ink includes a resin dispersion pigment, fine resin particles, a water-soluble organic solvent, and water.

The resin-dispersed pigment is able to be dispersed in water by, for example, a pigment dispersion resin (resin dispersant). The resin-dispersed pigment is not particularly limited, and examples include carbon black, inorganic pigments, organic pigments, and the like. Examples of the carbon black include furnace black, lamp black, acetylene black, channel black, and the like. Examples of inorganic pigments include titanium oxide, iron oxide based inorganic pigments, carbon black based inorganic pigments, and the like. Examples of organic pigments include: azo pigments such as azo lakes, insoluble azo pigments, condensed azo pigments, and chelate azo pigments; polycyclic pigments such as phthalocyanine pigments, perylene and perinone pigments, anthraquinone pigments, quinacridone pigments, dioxazine pigments, thioindigo pigments, isoindolinone pigments, and quinophthalone pigments; dye lake pigments such as basic dye type lake pigments and acidic dye type lake pigments; nitro pigments; nitroso pigment; aniline black daylight fluorescent pigments; and the like. Other examples of resin-dispersed pigments include: C.I. Pigment Black 1, 6, and 7; C.I. Pigment Yellow 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Orange 31 and 43; C.I. Pigment Red 2, 3, 5, 6, 7, 12, 15, 16, 48, 48:1, 48:3, 53:1, 57, 57:1, 112, 122, 123, 139, 144, 146, 149, 150, 166, 168, 175, 176, 177, 178, 184, 185, 190, 202, 209, 221, 222, 224, 238, and 254; C. I. Pigment Violets 19 and 196; C. I. Pigment Blue 1, 2, 3, 15, 15:1, 15:2, 15:3, 15:4, 16, 22, and 60; C. I. Pigment Green 7 and 36; solid solutions of these pigments; and the like. Note that the ink may further contain other pigments, dyes, and the like in addition to the resin-dispersed pigment.

The solid pigment content of the resin dispersion pigment relative to the total mass of the water-based ink is not particularly limited and can be suitably determined, for example, by a desired optical density, chroma, or the like. The solid pigment content is preferably within, for example, a range of 0.1 to 20 mass %, more preferably within a range of 1 to 15 mass %, and particularly preferably within a range of 2 to 10 mass %. The solid pigment content is the mass of only the pigment and does not include the mass of the fine resin particles. One type of resin dispersion pigment may be used alone, or two or more types may be used in combination.

Fine resin particles containing at least one of methacrylic acid and acrylic acid as a monomer can be used as the fine resin particles, and for example, a commercial product can be used. The fine resin particles may further contain styrene, vinyl chloride, or the like as a monomer. The fine resin particles may be contained, for example, in a resin emulsion. The resin emulsion is composed of, for example, fine resin particles and a dispersion medium (for example, water or the like). The fine resin particles are dispersed in a specific particle diameter range without being dissolved in the dispersion medium. Examples of fine resin particles contained in the resin emulsion include acrylic acid resins, maleic acid ester resins, vinyl acetate resins, carbonate resins, polycarbonate resins, styrene resins, ethylene resins, polyethylene resins, propylene resins, polypropylene resins, urethane resins, polyurethane resins, polyester resins, and copolymer resins of these.

A glass transition temperature (Tg) of the fine resin particles is not particularly limited, but it is 30° C. or more. The Tg of the fine resin particles is preferably within a range of 30° C. to 120° C., more preferably within a range of 30° C. to 100° C., and particularly preferably within a range of 30° C. to 80° C. When using fine resin particles having a Tg of 30° C. or more, ink having excellent abrasion resistance can be obtained on the recording medium.

In embodiments, as the resin emulsion, a commercially available product may be used. Examples of commercial products include "Hyros-X (registered trademark) KE-1062" and "Hyros-X (registered trademark) QE-1042" made by Seiko PMC Corporation, "Mowinyl (registered trademark) 6969D," "Mowinyl (registered trademark) 5450," "Mowinyl (registered trademark) DM774," and "Mowinyl (registered trademark) 6899D" made by Japan Coating Resin Co., Ltd., "Superflex (registered trademark) 150" made by DKS Co., Ltd., and the like.

An average particle diameter of the fine resin particles is, for example, 30 nm to 200 nm. The average particle diameter can be measured as an arithmetic average diameter using, for example, a dynamic light scattering particle diameter distribution measuring device "LB-550" made by Horiba, Ltd.

A fine resin particle content relative to the total mass of the water-based ink is preferably within, for example, a range of 0.1 to 30 mass %, more preferably within a range of 0.5 to 20 mass %, and particularly preferably within a range of 1 to 10 mass %. One type of fine resin particle may be used alone, or two or more types may be used in combination.

A compounding ratio of the fine resin particles to the resin-dispersed pigment (mass of the fine resin particles: mass of the resin-dispersed pigment) is preferably within a range of 2:1 to 1:2.

The water-soluble organic solvent is related to the quickness of drying of the ink during void printing. The water-soluble organic solvent is one or more types selected from a diol compound having six to eight carbon atoms and two hydroxyl groups, at least one hydroxyl group not being bonded to a terminal of the carbon chain, and a glycol ether. Examples of the diol compound include 1,2-hexanediol, 1,2-octanediol, and 2-ethyl-1,3-hexanediol. In embodiments, the glycol ether is triethylene glycol monobutyl ether (BTG). The water-soluble organic solvent preferably contains a diol-based compound, more preferably a diol-based compound having no alkyl chain branching from the main carbon chain.

A water-soluble organic solvent content relative to the total mass of the water-based ink is preferably within, for example, a range of 0.1 to 20 mass %, more preferably within a range of 0.5 to 15 mass %, and particularly preferably within a range of 1 to 10 mass %.

A compounding ratio of the fine resin particles to the water-soluble organic solvent (mass of the fine resin particles:mass of the water-soluble organic solvent) is preferably within a range of 3:1 to 1:3.

The ink contains, as another organic solvent, a water-soluble organic solvent having a vapor pressure of 0.03 hPa or more at 20° C. (hereinafter referred to as "specific organic solvent"). Examples of the specific organic solvent include propylene glycol (vapor pressure at 20° C.: 0.11 hPa), diethylene glycol (vapor pressure at 20° C.: 0.03 hPa), and the like, and propylene glycol is preferable. When the specific organic solvent is propylene glycol, excellent ink having superior resistance to abrasion to the recording medium can be obtained.

The organic solvent may contain an organic solvent other than the specific organic solvent. Wetting agents other than the specific organic solvent are not particularly limited, and examples include glycerin, triethylene glycol, butylene glycol, dipropylene glycol, tripropylene glycol, thiodiglycol, trimethylolpropane, trimethylolethane, polyethylene glycol, polypropylene glycol, 2-pyrrolidone, trimethylglycine, and the like. One type of the organic solvents may be used alone, or two or more types may be used in combination. However, the ink preferably has 10 mass % or less of substances having a vapor pressure of 0.03 hPa or less at 20° C. with respect to the total mass of ink and particularly preferably contains none.

The water is preferably deionized water or pure water. The water content relative to the total mass of the ink is preferably, for example, within a range of 10 to 90 mass %, more preferably within a range of 20 to 80 mass %. The water content may be, for example, the remainder after other components.

The ink may further contain a conventionally known additive as necessary. Examples of additives include surfactants, pH adjusting agents, viscosity adjusting agents, surface tension adjusting agents, fungicides, and the like.

Examples of viscosity adjusting agents include polyvinyl alcohol, cellulose, water-soluble resin, and the like.

The ink can be prepared, for example, by uniformly mixing a resin dispersion pigment, fine resin particles, a specific organic solvent, water, and, as necessary, other added components using a conventionally known method and removing insoluble matter using a filter or the like.

The surface tension of the ink is preferably 30 mN/m or less, more preferably 25.0 mN/m or more and 30 mN/m or less.

[Operation of the Printing Device 10]

Figure 5:
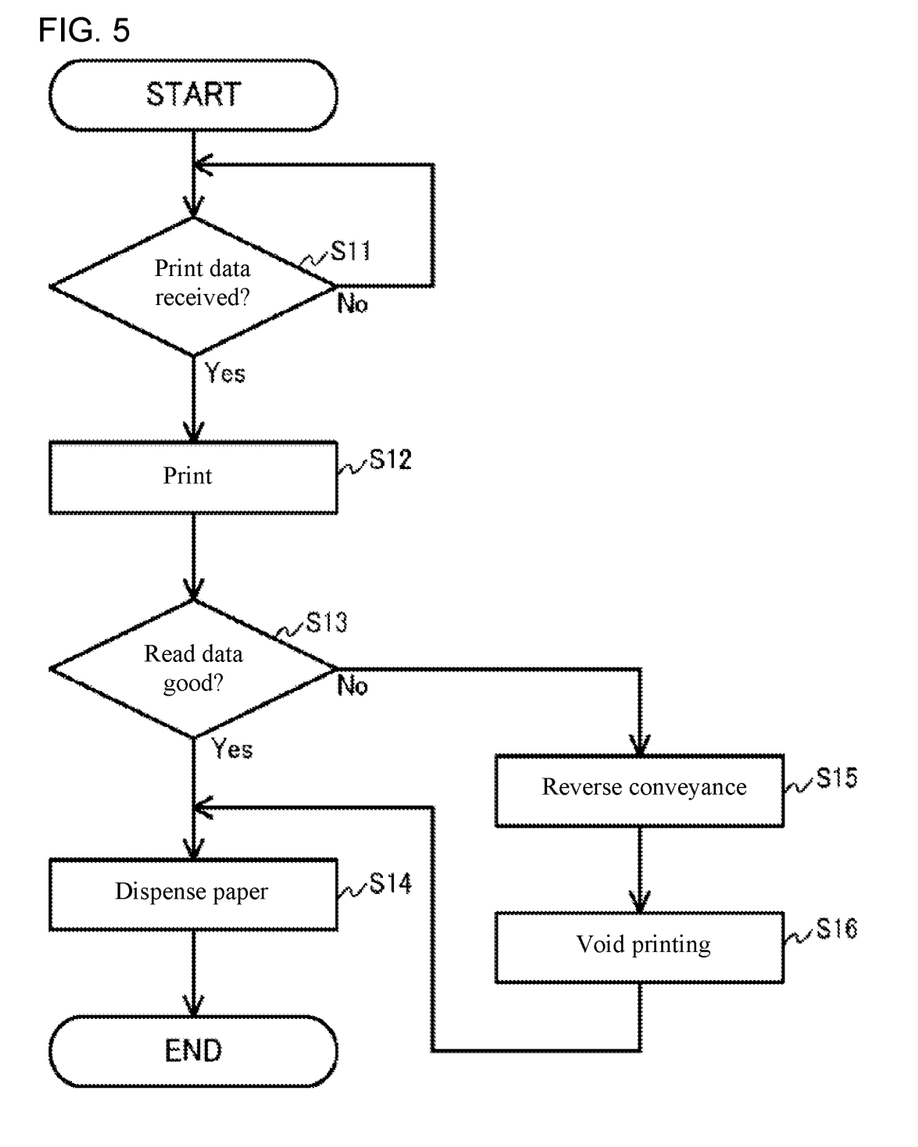
FIG. 5 is a flowchart illustrating operation of the printing device 10.

An image recording operation by the printing device 10 is described below with reference to FIG. 5.

When the controller 74 receives print data (S11: Yes), printing is executed (S12). Specifically, the controller 74 rotates (forward rotation) the feed roller 25, the conveyance roller 26, and the dispensing roller 27 to send the sheet 6 to a lower side of the print head 34.

At the position opposite the heater 38, the controller 74 rotates the conveyance roller 26 and the dispensing roller 27 such that the conveyance speed of the sheet 6 conveyed in the conveyance direction (frontward in the front and back direction 8) by the conveyance roller 26 and the dispensing roller 27 is within the preferable range described above. This type of control of the conveying speed is realized by, for example, controlling the rotation of the conveyance roller 26 based on a signal of the rotary encoder 96 provided on the conveyance roller 26.

Furthermore, the controller 74 energizes the halogen lamp 40 of the heater 38. The controller 74 controls the power (W) energizing the heater 38 such that the irradiation energy per unit area of the heater 38 is within the above preferable range. Then, the controller 74 discharges ink toward the sheet 6 from the print head 34 based on the print data while rotating (forward rotation) the feed roller 25, the conveyance roller 26, and the dispensing roller 27.

The sheet 6 conveyed on the platen 28 toward the paper dispensing tray 24 moves toward the paper dispensing tray 24 while being suctioned to the upper surface of the platen 28 between the conveyance roller 26 and the dispensing roller 27. Ink drops discharged from the print head 34 adhere to the sheet 6 supported by the upper surface of the platen 28. When the sheet 6 to which ink drops adhere reaches the lower side of the heater 38, the sheet 6 is heated by the heater 38. The ink drops are fixated on the sheet 6 by heating using the heater 38.

The controller 74 operates the CIS 29 to read an image on the sheet 6 (an embodiment of the first image) passing below the CIS 29 to acquire image data. The controller 74 determines whether the image printed on the sheet 6 is correct by analyzing the image data received from the CIS 29 (S13).

For example, when a bar code symbol is included in the acquired image data, the controller 74 can determine whether the image is correct according to whether optical characteristics (reflectance, reflection density, PCS (print contrast signal) value, and the like) of the barcode symbol included in the image data satisfy JIS standards (Japanese Industrial Standards). Accordingly, the controller 74 determines the image printed on the sheet 6 to be "correct" when the optical characteristics of the barcode symbol included in the acquired image data are within the threshold range corresponding to the JIS standards stored in advance in the ROM 132, RAM 133, EEPROM 134, and the like and determines the image printed on the sheet 6 to be "incorrect" when the optical characteristics of the barcode symbol are not within the threshold range. Note that the method of determining whether the image printed on the sheet 6 is correct using the CIS 29 is one example, and other commonly known determination methods may be used. Furthermore, the image on the sheet 6 (first image) read by the CIS 29 is not limited to a barcode symbol and may be, for example, a two-dimensional code such as a QR code (registered trademark).

On the condition that the determination result of the image data is correct (S13: Yes), the controller 74 dispenses the sheet 6 after printing to the paper dispensing tray 24 (S14) and ends printing.

On the condition that the determination result of the image data is incorrect (S13: No), the controller 74 reverses the conveyance roller 26 and the dispensing roller 27 to return the sheet 6 to below the printing head 34 (S16). When the downstream end of the sheet 6 in the conveying direction reaches the upstream side of the conveying direction from the print head 34, the controller 74 discharges ink from the print head 34 onto the sheet 6 based on void print data while rotating the conveyance roller 26 and the dispensing roller 27 forward. Thus, a void image (an embodiment of the second image) is printed on top of the image recorded on the sheet 6 (S16). The void image is composed of, for example, the alphabetical characters "VOID." Note that the void printing may be executed while the sheet 6 is being conveyed in the conveying direction or may be executed while the sheet 6 is being conveyed in the direction opposite to the conveying direction.

When the sheet 6 to which ink drops are adhered by void printing reaches the lower side of the heater 38, the sheet 6 is heated by the heater 38. The ink drops are fixated on the sheet 6 by heating using the heater 38. Then, the controller 74 dispenses the sheet 6 on which void printing is performed to the paper dispensing tray 24 (S14) and ends printing.

The water-soluble organic solvent contained in the ink is at least one type selected from a diol compound having six to eight carbon atoms and two hydroxyl groups, at least one hydroxyl group not being bonded to a terminal of the carbon chain, and a glycol ether, and thus the ink adhered to the sheet 6 by void printing presumably more readily penetrates the sheet 6, improving quickness of drying.

Furthermore, the ink has 10 mass % or less of substances having a vapor pressure of 0.03 hPa or less at 20° C. and has a surface tension of 30 mN/m or less, and thus the ink presumably more readily evaporates when heated by the heater 38 while adhered to the sheet 6 during void printing, improving the abrasion resistance of the ink during void printing.

EXAMPLES

Examples of the present disclosure will be described below along with comparative examples. Note that the present disclosure is not limited to or constricted by the following examples and comparative examples.
[Pigment Dispersion Solution A]

Pure water was added to 20 mass % of pigment (carbon black) and 7 mass % of a sodium hydroxide neutralized product of a styrene-acrylic acid copolymer (acid value of 175 mg KOH/g, molecular weight of 10,000) to make 100 mass % of the total, and a mixture was obtained by stirring and mixing. This mixture was placed in a wet sand mill filled with 0.3 mm diameter zirconia beads and then dispersed for 6 hours. Then, the zirconia beads were removed using a separator and filtered using a cellulose acetate filter having a pore diameter of 3.0 μm, thereby obtaining a pigment dispersion A. Note that the styrene-acrylic acid copolymer was a water-soluble polymer generally used as a pigment dispersant.
[Preparation of Water-Based Recording Ink]

The following components, excluding the fine resin particles and resin-dispersed pigment dispersion solution in the composition shown in Table 1, were uniformly mixed to obtain an ink solvent. Next, fine resin particles were added, and after mixing uniformly, the resin-dispersed pigment dispersion solution was added, and a mixture was obtained with the total amount being 100 mass %. The obtained mixture was filtered using a cellulose acetate membrane filter (pore diameter of 3.00 μm) made by Toyo Roshi Kaisha, Ltd. to obtain the water-based recording ink of examples 1 through 5 and comparative examples 1 through 4. Fine resin particles: "Mowinyl (registered trademark) 6969D" made by Japan Coating Resin Co., Ltd.

Wetting agent: glycerin (vapor pressure at 20° C.: less than 0.01 hPa), propylene glycol (vapor pressure at 20° C.: 0.11 hPa)

Surfactant: "Olfine (registered trademark) E1004" made by Nisshin Chemical Industry Co., Ltd.

Water-soluble organic solvent: 1,2-hexanediol, 1,2-octanediol, 2-ethyl-1,3-hexanediol, triethylene glycol monobutyl ether (BTG), 1,2-butanediol, 1,6-hexanediol The water-based recording ink of examples 1 through 5 and comparative examples 1 through 5 was used to perform image recording and void printing on coated paper, and evaluation of quickness of drying and abrasion resistance was performed by the following method.
[Quickness of Drying]

Using an "Inkjet Printer MFC-J4225N" made by Brother Industries, Ltd., the water-based recording ink of examples 1 through 5 and comparative examples 1 through 5 were used to record an image of a single color patch with a resolution of 600×300 dpi on coated paper ("OK Top Coat+" made by Oji Paper Co., Ltd.) to produce evaluation samples. After that, a load of 500 g was applied to a cotton swab made by Johnson and Johnson, and a scratch test of the evaluation sample was performed. The scratched evaluation samples and a blank portion adjacent to the ink application portion were evaluated visually according to the following evaluation criteria. Note that abrasion is a visible scratch mark in the ink application portion, and a stain is a visible scratch mark in the blank portion (a mark where the ink adhered to the cotton swab is transferred).

AA: No abrasion or stains.
A: Abrasion present, but no stains.
C: Abrasion and stains.
[Abrasion Resistance of Void Printed Portion]

Using an "Inkjet Printer MFC-J4225N" made by Brother Industries, Ltd., the water-based recording ink of examples 1 through 5 and comparative examples 1 through 5 were used to record an image of a single color patch with a resolution of 600×300 dpi on coated paper ("OK Top Coat+" made by Oji Paper Co., Ltd.) to produce evaluation samples. Then, the evaluation samples were passed directly under a "Promo Handy Mini SIR-760" IR heater (heated length 6.2 cm, output 600 W) made by Tohkoh Trade Co., Ltd. to dry them. Then, ink was again recorded on top for the ink application portion by the same method, and this was similarly dried. Subsequently, scratching was repeated 100 rounds under a 500 g load using a "AB-301 Color Fastness Rubbing Tester" made by Tester Sangyo Co., Ltd. to perform a scratch test on the evaluation samples. The scratched evaluation samples and a blank portion adjacent to the solid black portion were evaluated visually according to the following evaluation criteria.
AA: No stains
A: Slight stains
C: Stains
[Overall Grade]
The overall grade was evaluated by the following evaluation criteria based on the evaluation of quickness of drying and abrasion resistance.
A: Both items are AA
B: One item is AA, and the other item is A
C: Both items are A
D: One item is A, and the other item is C
E: Both items are C
The recording water-based ink compositions and evaluation results of examples 1 through 5 and comparative examples 1 through 5 are shown in Table 1.

C., the overall grade was A or B, and the evaluation results were superior to those of example 5, which had an overall grade of C.

In examples 1 through 3, in which the water-soluble organic solvent was a diol compound, the void printed portion abrasion resistance was evaluated as AA. In examples 1, 2, and 4, in which the water-soluble organic solvent did not have an alkyl chain branching from the main carbon chain, the quickness of drying was evaluated as AA.

In examples 1 and 2, in which the water-soluble organic solvent is 1,2-hexanediol or 1,2-octanediol, the overall grade was A, and the evaluation results were superior to examples 3 through 5, which had an overall grade of B or C.

However, comparative example 1, which did not contain a water-soluble organic solvent, yielded an overall grade of E. Also, comparative examples 2 and 3, which contained 1,2-butanediol, which had less than six carbon atoms, or 1,6-hexanediol as the water-soluble organic solvent, yielded

TABLE 1

| | | | Examples | | | | |
|---|---|---|---|---|---|---|---|
| | | | 1 | 2 | 3 | 4 | 5 |
| Water-based recording ink composition | Resin-dispersed pigment | Carbon black | 5.00 | 5.00 | 5.00 | 5.00 | 5.00 |
| | Fine resin particles | Mowinyl 6969D | 5.00 | 5.00 | 5.00 | 5.00 | 5.00 |
| | Wetting agent | Glycerin | — | — | — | — | 10.00- |
| | | Propylene glycol | 20.00 | 20.00 | 20.00 | 20.00 | 20.00 |
| | Surfactant | Olfine E1004 | 1.00 | 1.00 | 1.00 | 1.00 | 1.00 |
| | Organic solvent | 1,2-Hexanediol | 3.00 | — | — | — | 3.00 |
| | | 1,2-Octanediol | — | 3.00 | — | — | — |
| | | 2-Ethyl-1,3-hexanediol | — | — | 3.00 | — | — |
| | | BTG | — | — | — | 3.00 | — |
| | | 1,2-Butanediol | — | — | — | — | — |
| | | 1,6-Hexanediol | — | — | — | — | — |
| | | Water | Remainder | Remainder | Remainder | Remainder | Remainder |
| | Surface tension (mN/m) | | 28.6 | 25.6 | 27.7 | 29.6 | 28.4 |
| | Quickness of drying | | AA | AA | A | AA | A |
| | Abrasion resistance during void printing | | AA | AA | AA | A | A |
| | Overall grade | | A | A | B | B | C |

| | | | Comparative Examples | | | | |
|---|---|---|---|---|---|---|---|
| | | | 1 | 2 | 3 | 4 | 5 |
| Water-based recording ink composition | Resin-dispersed pigment | Carbon black | 5.00 | 5.00 | 5.00 | 5.00 | 5.00 |
| | Fine resin particles | Mowinyl 6969D | 5.00 | 5.00 | 5.00 | 5.00 | 5.00 |
| | Wetting agent | Glycerin | — | — | — | 11.00 | — |
| | | Propylene glycol | 20.00 | 20.00 | 20.00 | 20.00 | 20.00 |
| | Surfactant | Olfine E1004 | 1.00 | 1.00 | 1.00 | 1.00 | 0.40 |
| | Organic solvent | 1,2-Hexanediol | — | — | — | 3.00 | 3.00 |
| | | 1,2-Octanediol | — | — | — | — | — |
| | | 2-Ethyl-1,3-hexanediol | — | — | — | — | — |
| | | BTG | — | — | — | — | — |
| | | 1,2-Butanediol | — | 3.00 | — | — | — |
| | | 1,6-Hexanediol | — | — | 3.00 | — | — |
| | | Water | Remainder | Remainder | Remainder | Remainder | Remainder |
| | Surface tension (mN/m) | | 28.6 | 28.6 | 29.0 | 28.3 | 30.4 |
| | Quickness of drying | | C | C | C | C | C |
| | Abrasion resistance during void printing | | C | A | C | C | C |
| | Overall grade | | E | D | E | E | E |

*The values in the resin-dispersed pigment section are solid quantities of pigment.

*The values in the fine resin particles section are solid quantities of resin.

As illustrated in Table 1, in embodiments 1 through 5, there was no C evaluation for either quickness of drying or abrasion resistance, and the evaluation results were favorable. In examples 1 through 4, which did not contain glycerin having a vapor pressure of 0.03 hPa or less at 20° an overall grade of D or E. Comparative example 4, which contained 1,2-hexanediol as the water-soluble organic solvent but contained 11 mass % of glycerin having a vapor pressure of 0.03 hPa or less at 20° C., yielded an overall grade of E. Comparative example 5, which contained 1,2-hexanediol as the water-soluble organic solvent and had a surface tension of 30 mN/m or more, yielded a total grade of E.

Obviously, numerous modifications and variations of the present invention(s) are possible in light of the above teachings. It is therefore to be understood that within the scope of the appended claims, the invention(s) may be practiced otherwise than as specifically described herein.

The invention claimed is:

1. A recording method comprising:
   discharging a water-based recording ink from a head onto a recording medium conveyed in a conveying direction and heating the recording medium or the water-based recording ink adhered to the recording medium with a heater to record a first image on the recording medium;
   reading the first image to determine whether the first image is correctly recorded; and
   when the first image is determined as not being correctly recorded, conveying the recording medium in a reverse direction relative to the conveying direction, and recording a second image over the first image,
   wherein
   the water-based recording ink comprises: a resin-dispersed pigment; a fine resin particle; a water-soluble organic solvent; and water,
   the water-soluble organic solvent comprises at least one selected from the group consisting of a glycol ether and a diol compound having six to eight carbon atoms and two hydroxyl groups, at least one of the two hydroxyl groups not being bonded to a terminal of a carbon chain of the diol compound, and
   a content of substances having a vapor pressure of 0.03 hPa or less at 20° C. in the water-based recording ink relative to a total mass of the water-based recording ink is 10 mass % or less, and a surface tension of the water-based recording ink is 30 mN/m or less,
   and wherein a cumulative heating amount received by the recording medium from the heater at a position opposing the heater per unit area of the recording medium is within a range of 0.05 J/cm$^2$ or more and 2.50 J/cm$^2$ or less.

2. The recording method according to claim 1, wherein the water-based recording ink does not comprise a substance having a vapor pressure of 0.03 hPa or less at 20° C.

3. The recording method according to claim 1, wherein the water-soluble organic solvent comprises a diol compound having six to eight carbon atoms and two hydroxyl groups, at least one of the two hydroxyl groups not being bonded to a terminal of the carbon chain of the diol compound.

4. The recording method according to claim 3, wherein the diol compound does not have an alkyl chain branching from a main carbon chain thereof.

5. The recording method according to claim 4, wherein the diol compound is at least one selected from the group consisting of 1,2-hexanediol and 1,2-octanediol.

6. The recording method according to claim 1, wherein the heater is an infrared heater.

7. The recording method according to claim 1, wherein the first image is read by a contact image sensor.

8. The recording method according to claim 1, wherein a distance between the head and the heater is 30 cm or less.

9. The recording method according to claim 1, wherein a conveying speed of the recording medium at a position where the recording medium opposes the heater is within a range of 20 cm/sec or more and 100 cm/sec or less.

10. The recording method according to claim 1, wherein a power consumption of the heater is 600 W or less.

11. The recording method according to claim 1, wherein an irradiation length of the heater in a width direction orthogonal to the conveying direction in the recording medium is 25 cm or less.

12. The recording method according to claim 1, wherein the cumulative heating amount received by the recording medium from the heater at a position opposing the heater per unit area of the recording medium is within a range of 0.05 J/cm$^2$ or more and 1.50 J/cm$^2$ or less.

13. The recording method according to claim 12, wherein said second image is recorded over the first image with the same water-based recording ink used to record the first image on the recording medium.

14. The recording method according to claim 1, wherein the cumulative heating amount received by the recording medium from the heater at a position opposing the heater per unit area of the recording medium is within a range of 0.06 J/cm$^2$ or more and 0.25 J/cm$^2$ or less.

15. The recording method according to claim 14, wherein said second image is recorded over the first image with the same water-based recording ink used to record the first image on the recording medium.

16. The recording method according to claim 15, wherein:
   a distance between the head and the heater is 10 cm or less;
   a conveying speed of the recording medium at a position where the recording medium opposes the heater is within a range of 20 cm/sec or more and 70 cm/sec or less; and
   a power consumption of the heater is 200 W or less.

17. The recording method according to claim 16, wherein a surface tension of the ink is 25.0 mN/m or more and 30 mN/m or less.

18. The recording method according to claim 1, wherein said second image is recorded over the first image with the same water-based recording ink used to record the first image on the recording medium.

19. The recording method according to claim 1, wherein:
   a distance between the head and the heater is 10 cm or less;
   a conveying speed of the recording medium at a position where the recording medium opposes the heater is within a range of 20 cm/sec or more and 70 cm/sec or less; and
   a power consumption of the heater is 200 W or less.

20. The recording method according to claim 19, wherein a surface tension of the ink is 25.0 mN/m or more and 30 mN/m or less.

* * * * *